`US007659023B2`

United States Patent
Murphy

(10) Patent No.: US 7,659,023 B2
(45) Date of Patent: Feb. 9, 2010

(54) MULTI-ZONE VOLTAGE FUEL CELL

(75) Inventor: Michael W Murphy, Manchester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 886 days.

(21) Appl. No.: 10/925,755

(22) Filed: Aug. 25, 2004

(65) Prior Publication Data

US 2006/0046110 A1    Mar. 2, 2006

(51) Int. Cl.
*H01M 8/10* (2006.01)
*H01M 8/02* (2006.01)
*H01M 8/04* (2006.01)

(52) U.S. Cl. .............................. 429/30; 429/34; 429/38
(58) Field of Classification Search .................. None
See application file for complete search history.

(56) References Cited

U.S. PATENT DOCUMENTS 5,069,985 A * 12/1991 Cohen et al. ................. 429/26
5,190,834 A * 3/1993 Kendall ....................... 429/31
6,280,870 B1 * 8/2001 Eisman et al. ............... 429/34
6,372,376 B1 * 4/2002 Fronk et al. .................. 429/41
2005/0100771 A1 * 5/2005 Vyas et al. ................... 429/32

FOREIGN PATENT DOCUMENTS

WO    WO 0195416 A1 * 12/2001

OTHER PUBLICATIONS

S.J. Lee et al., "Design with fabrication of a micro fuel cell array with 'flip-flip' interconnection," Journal of Power Sources 112 (2002), pp. 410-418.
C. Hebling, "Technology and Markets of Micro Fuel Cell Systems," undated (2 pages).

* cited by examiner

*Primary Examiner*—Dah-Wei D Yuan
*Assistant Examiner*—Edu E Enin-Okut
(74) *Attorney, Agent, or Firm*—Harness, Dickey & Pierce, P.L.C.

(57) ABSTRACT

The present invention is directed to an electrochemical fuel cell. The configuration of the fuel cell stack provides a multiple-legged current flow path therethrough. Electrically isolated zones are formed in the cells and one coupled in a serial manner. This configuration provides incremental voltage summing such that additional power converting element are not needed to match the stack output to the load.

9 Claims, 5 Drawing Sheets

MULTI-ZONE VOLTAGE FUEL CELL

FIELD OF THE INVENTION

The present invention relates to fuel cells, and more particularly to a multi-zone increased voltage fuel cell.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a polymer electrolyte membrane (PEM) that is sandwiched between an anode and a cathode. More specifically, an anode membrane and a cathode membrane form a membrane electrode assembly (MEA). To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

One characteristic of PEM fuel cells is that power is often provided at a higher current and a lower voltage than is required by the loads they are connected to. As a result, a power conversion device is incorporated between the load and the fuel cell stack to step up the voltage supplied to the load. Such power conversion devices increase cost, weight and volume of the fuel cell system.

SUMMARY OF THE INVENTION

Accordingly, the present invention provides a fuel cell stack having a multiple-legged current flow path defined therethrough. Electrically-isolated zones can be formed in the cell and coupled in a serial manner so as to provide a voltage summing within the cell. The fuel cell stack includes a membrane electrode assembly (MEA) and a first bipolar plate having a first side adjacent to the MEA. The first bipolar plate includes at least one cathode gas flow path and at least one anode gas flow path formed in the first side. A second bipolar plate includes a second side adjacent to the MEA and at least one anode gas flow path and at least one cathode gas flow path formed in the second side and arranged opposite from the first cathode gas flow path and the first anode gas flow path respectfully across the MEA. The first cathode and the second anode gas flow paths together with a first portion of the MEA form a first leg in the current flow path. The opposing second cathode and first anode gas flow paths together with a second portion of the MEA form a second leg in the current flow path.

In one feature, the fuel cell stack further includes first and second electrode pads formed on the first bipolar plate. Third and fourth electrode pads are formed on the second bipolar plate and are respectively offset from the first and second electrode pads across the MEA. The first and third electrode pads transfer current flow of the first leg in the current path and the second and fourth electrode pads transfer current flow of the second leg in the current path.

In another feature, the fuel cell stack further includes a third cathode gas flow path formed in the first side of the first bipolar plate and a third anode gas flow path formed in the second side of the second bipolar plate. The third anode gas flow path is arranged opposite from the third cathode gas flow path across the MEA. The third cathode gas flow path and the third anode gas flow path define a third leg in the current flow path together with a third portion of the MEA.

In another feature, the fuel cell stack further includes opposed electrode pads that are laterally offset in a staggered manner. For example, the first electrode pad is offset from the third electrode pad across the PEM to transfer current flow from the first leg to the second leg in the current flow path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
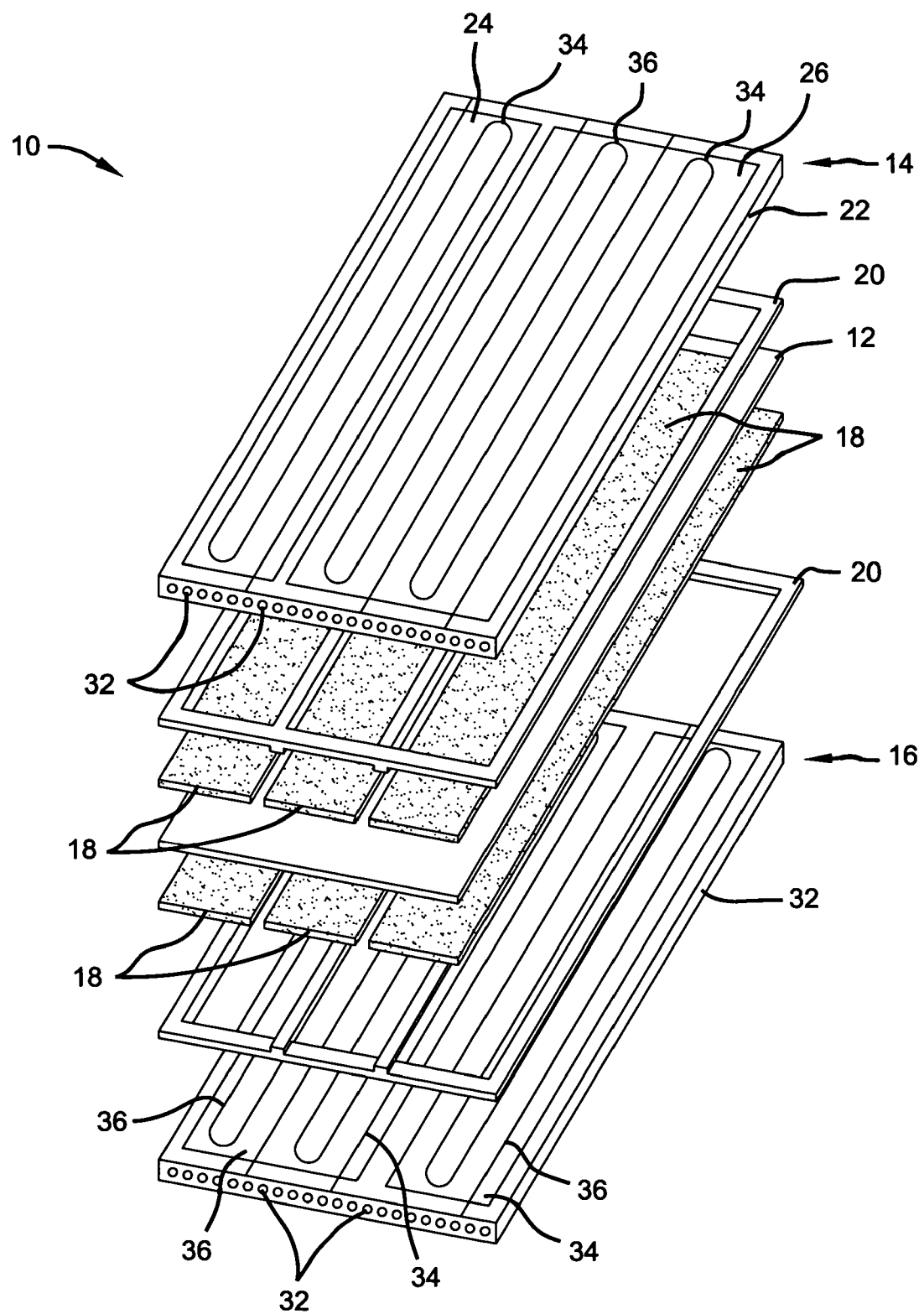
FIG. 1 is an exploded perspective view of a multi-zone fuel cell according to the present invention.

Referring now to FIG. 1, an exploded view of a multi-zone fuel cell 10 is shown. The multi-zone fuel cell 10 includes a membrane electrode assembly (MEA) 12 disposed between bipolar plates 14, 16. Layers of diffusion media 18 are disposed between the bipolar plates 14, 16 and the MEA 12. As discussed in further detail below, the bipolar plates 14, 16 enable flow of cathode and anode gas across the fuel cell surface and through the diffusion media 18 for reaction through the MEA 12. Gaskets 20 are disposed between the bipolar plates 14, 16 and the MEA 12. The gaskets 20 seal the various fluid paths of the multi-zone fuel cell 10 as described in detail herein.

As previously mentioned, bipolar plates 14, 16 are divided into electrically-isolated zones I, II, III which are connected in series to provide incremental voltage summing. Specifically, conductive pads 24, 26 and 34, 36 disposed on a non-conductive substrate 22, 32 define multiple zones which are laterally offset in a staggered relationship such that conductive pads 26, 36 electrically couple sequential zones. As a result, a relatively higher voltage and lower current output is generated for a given power output. Thus, by utilizing a multiple zone design, the fuel cell 10 can be configured to match its output to a given load requirement without the use of a transformer or converter.

Figure 2:
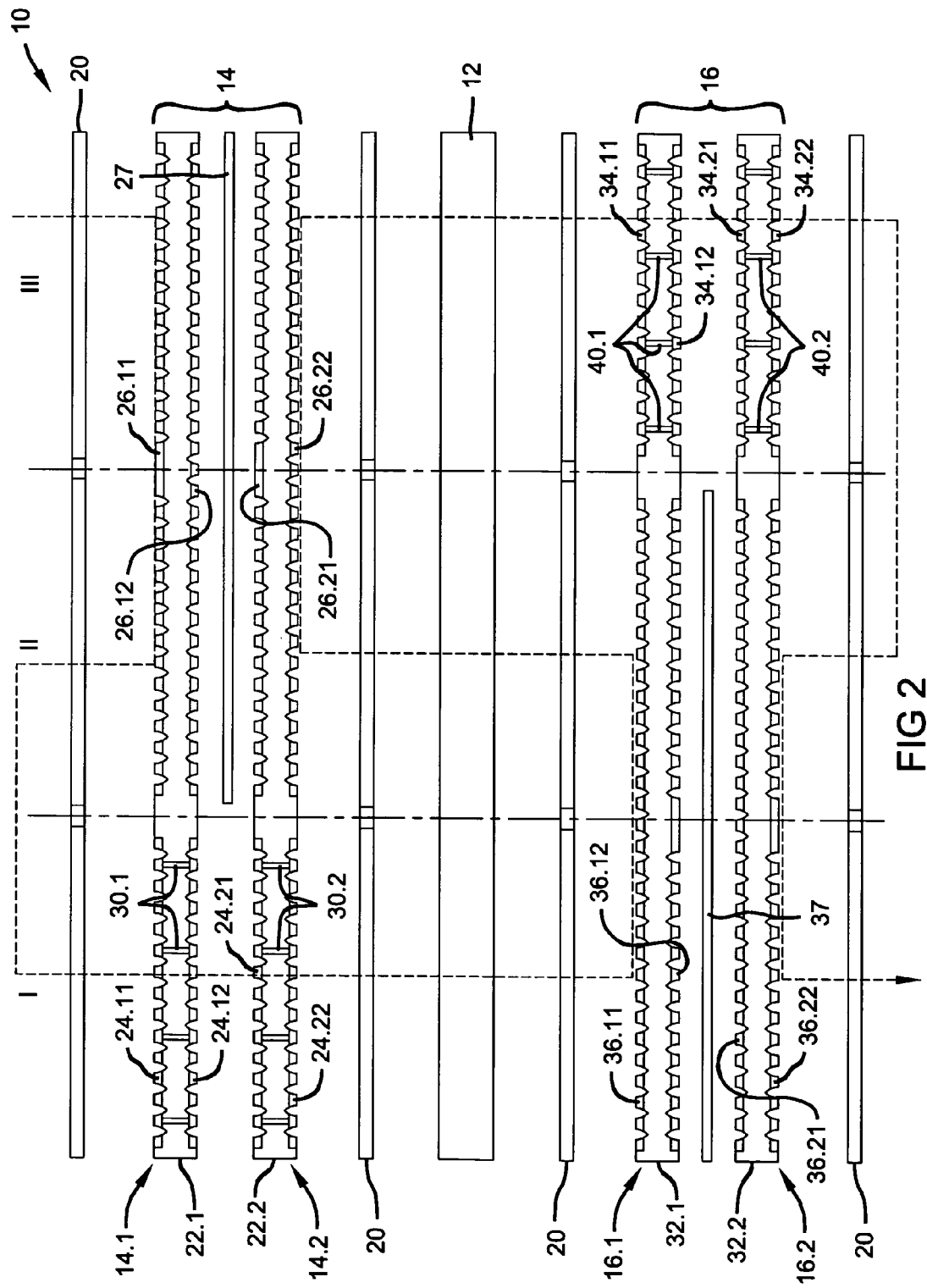
FIG. 2 is an exploded cross-section of a cell from the multi-zone fuel cell.
Figure 3:
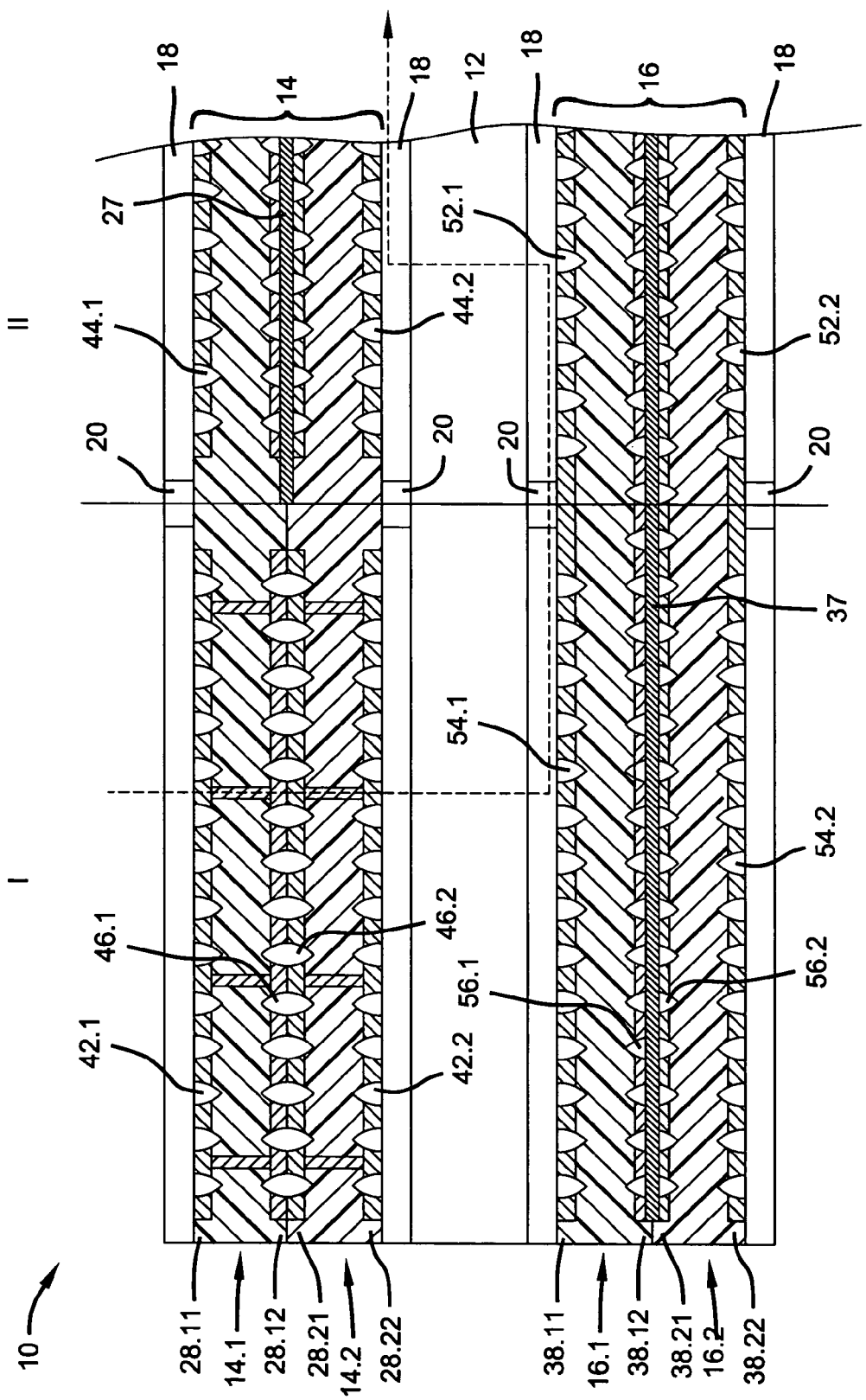
FIG. 3 is a more detailed cross section of the multi-zone fuel cell shown in FIG. 2.

Referring now to FIGS. 2 and 3, bipolar plate 14 is preferably constructed with a pair of electrode plates 14.1, 14.2 placed in facing relationship. Electrode plate 14.1 includes an electrically non-conductive substrate 22.1 with two sets of electrically conductive pads disposed on the opposite surfaces thereof. Specifically, upper pads 24.11, 26.11 are formed on upper surface 28.11 (FIG. 3) and lower pads 24.12, 26.12 are formed on the lower surface 28.12 (FIG. 3). Likewise, electrode plate 14.2 includes an electrically non-conductive substrate 22.2 with upper pads 24.21, 26.21 formed on upper surface 28.21 (FIG. 3) and lower pads 24.22, 26.22 formed on lower surface 28.22 (FIG. 3). Pad-to-pad continuity is established by conductors 30 extending through the substrate 22 from the upper pads to the lower pads in zone I. Specifically, conductors 30.1 extend through substrate 22.1 from upper pads 24.11 to lower pads 24.12 in zone I. Likewise, conductors 30.2 extend through substrate 22.2 from upper pads 24.21 to lower pads 24.22. The conductive pads 26.11 and 26.22 electrically connect zones II and III along a lateral conductive path. An insulating layer 27 is disposed between zones II and III to prohibit electrical communication between the bipolar plate halves 14.1 and 14.2 in zones II and III.

Bipolar plate 16 is preferably constructed with a pair of electrode plates 16.1, 16.2 placed in facing relationship. Electrode plate 16.1 includes an electrically non-conductive substrate 32.1 with two sets of electrically conductive pads 34.1, 36.1 disposed on the opposite surfaces thereof. Specifically, upper pads 34.11, 36.11 are formed on upper surface 38.11 (FIG. 3) and lower pads 34.12, 36.12 are formed on the lower surface 38.12 (FIG. 3). Likewise, electrode plate 16.2 includes an electrically non-conductive substrate 32.2 with upper pads 34.21, 36.21 formed on upper surface 38.21 (FIG. 3) and lower pads 34.24, 36.22 formed on lower surface 38.22 (FIG. 3). Pad-to-pad continuity is established by conductors 40 extending through the substrate 32 from the upper pads to the lower pads in zone III. Specifically, conductors 40.1 extend through substrate 32.1 from upper pads 34.11 to lower pads 34.12 in zone III. Likewise, conductors 40.2 extend through substrate 32.2 from upper pads 34.21 to lower pads 34.22. The conductive pads 36.11 and 36.22 electrically connect zones I and II along a lateral conductive path. An insulating layer 37 is disposed between zones I and II to prohibit electrical communication between the bipolar plate halves 16.1 and 16.2.

Conductive pad 24 on bipolar plate 14 overlays a portion of conductive pad 36 on bipolar plate 16, while conductive pad 26 on bipolar plate 14 overlays conductive pad 34 and a portion of conductive pad 36 on bipolar plate 16. In this manner a current flow path is established from conductive pad 26 to conductive pad 24, through MEA 12 to conductive pad 36 back through MEA 12 to conductive pad 26 through MEA 12 to conductive pad 34. Thus, the current flow path passes through the MEA 12 three times to establish a three-legged current flow path.

Figure 4A:
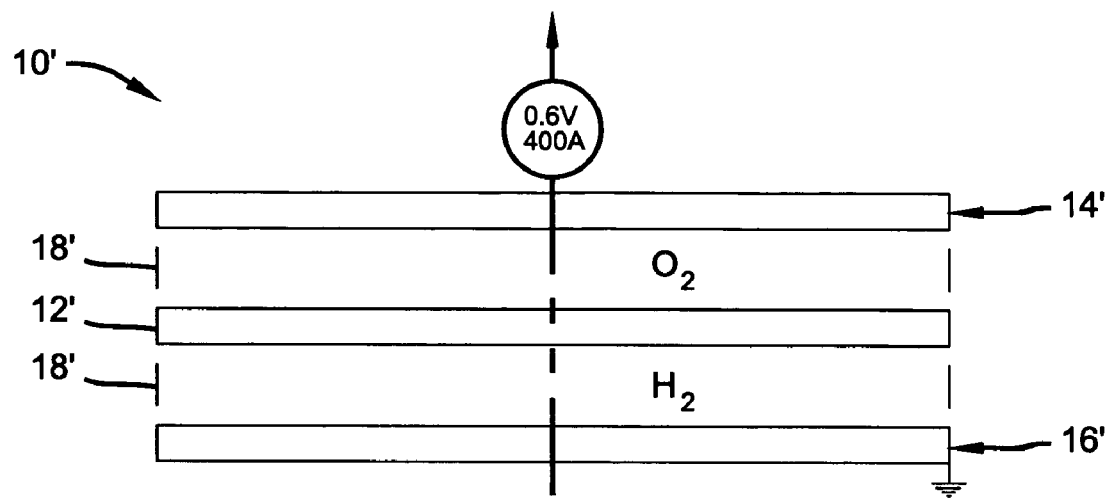
FIG. 4A is a schematic illustration of a traditional fuel cell.

Referring now to FIG. 4A-4D, the multiple-legged current flow plate of the present invention will be discussed by comparison to a conventional single legged current flow plate. FIG. 4A is a schematic cross-section of a conventional fuel cell 10' including an upper bipolar plate 14' and a lower bipolar plate 16' having an MEA 12' disposed therebetween. Anode feed gas flows through flow channels of the upper bipolar plate 14' and is diffused to the MEA 12' through medium 18'. Cathode feed gas flows through flow channels of the lower bipolar plate 16' and is diffused to the MEA 12' through medium 18'. A single zone of one-legged current flow path is established through fuel cell 10'. This configuration yields a voltage differential of 0.6V with a current output of 400 A for a total power output of 240 W, assuming an area of 500 cm$^2$.

Figure 4B:
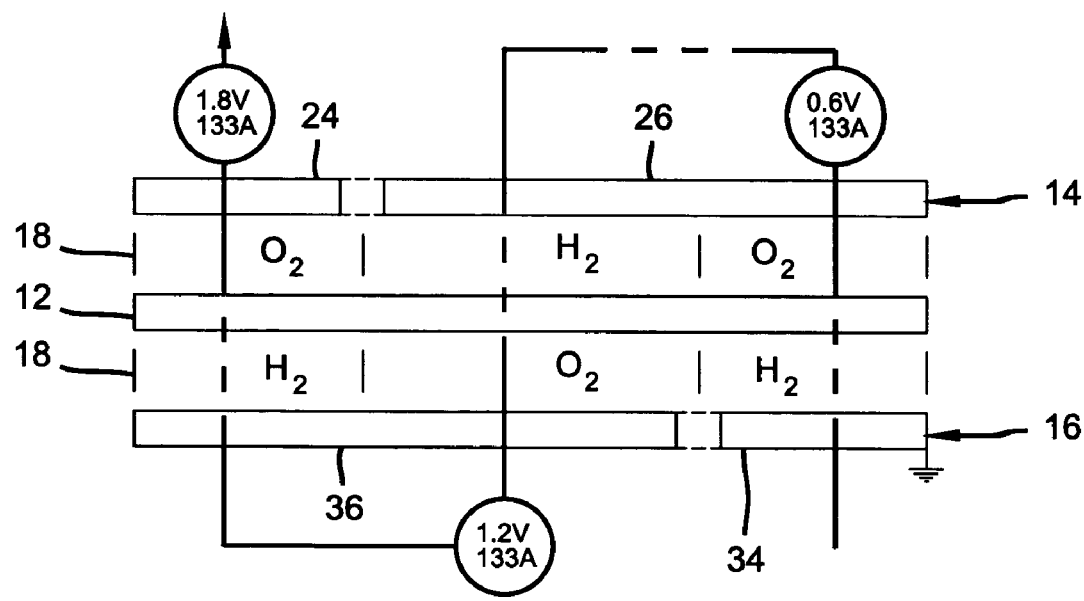
FIG. 4B is a schematic illustration of the multi-zone fuel cell of FIGS. 1 through 3.

FIG. 4B is a schematic cross-section of the fuel cell 10 illustrated in FIGS. 1-3. In particular, FIG. 4B schematically illustrates a multiple zone fuel cell stack 10 having a three-legged current flow path therethrough. To achieve this, the upper bipolar plate 14 is divided into two regions by conductive pads 24, 26 that are laterally offset in staggered relationship with conductive pads 34, 36 which likewise divide lower bipolar plate into two regions. This configuration yields a voltage differential of 1.8V with a current output of 133 A for a total power output of 240 W, again assuming an area of 500 cm$^2$.

Figure 4C:
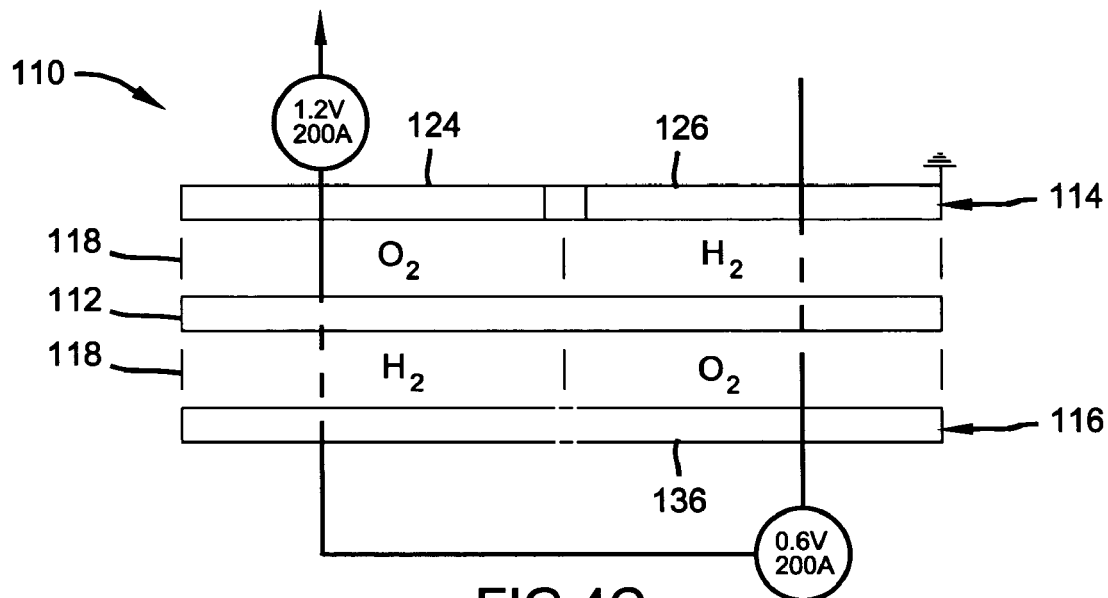
FIG. 4C is a schematic illustration of an alternative multi-zone fuel cell according to the present invention.

FIG. 4C is a schematic cross-section of an alternate embodiment of the present invention in which fuel cell 110 includes a two-legged current flow path therethrough. To achieve this, the upper bipolar plate 114 is divided into two regions by conductive pads 124, 126 that overlay a single conductive pad 136 on lower bipolar plate 116. For a fuel cell with the same area, this configuration yields a voltage differential of 1.2V with a current output of 200 A for a total power output of 240 W.

Figure 4D:
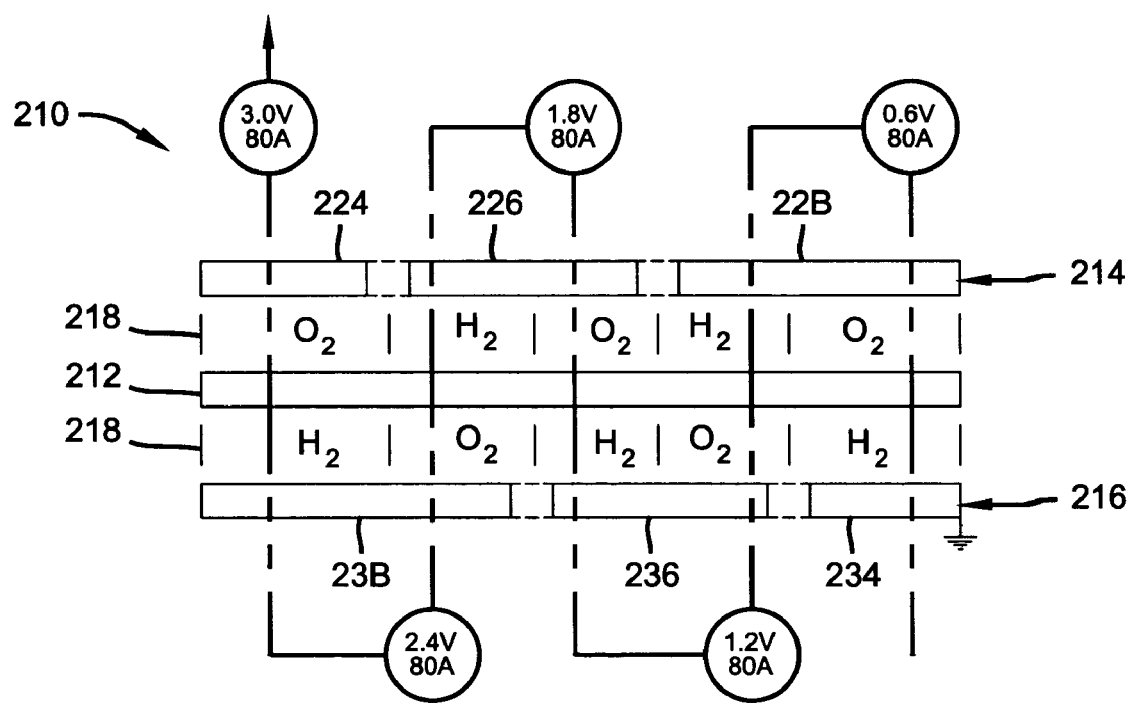
FIG. 4D is a schematic illustration of another alternative multi-zone fuel cell according to the present invention.

FIG. 4D is a schematic cross-section of another embodiment of the present invention in which fuel cell 210 includes a five-legged current flow path therethrough. To achieve this, the upper bipolar plate 214 is divided into three regions by conductive pads 224, 226, 228 that are laterally offset in staggered relationship with conductive pads 234, 236, 238 which likewise divide lower bipolar plate 21.6 into three regions. For a fuel cell with the same area, this configuration yields a voltage differential of 3.0V with a current output of 80 A for a total power output of 240 W.

Referring again to FIGS. 2 and 3, the details of the multi-zone fuel cell will be described further. Each electrode plate 14.1, 14.2 and 16.1, 16.2 includes flow channels formed therein. Electrode plate 14.1 has reactant gas flow channels 42.1, 44.1 formed on upper surface 28.11 which define cathode and anode reactant gas flow fields, respectively. Electrode plate 14.2 also has reactant gas flow channels 42.2, 44.2 formed on lower surface 28.22 which define anode and cathode reactant gas flow fields, respectively. Electrode plate 14.1 has coolant flow channels 46.1 formed on lower surface 28.12 which, in part define a coolant flow field. Electrode plate 14.2 has coolant flow channels 46.2 formed on upper surface 28.21 which in part define the coolant flow field.

As presently preferred, electrode plates 14.1, 14.2 are stacked together to form a bipolar plate 14. More specifically, lower surface 28.12 of one electrode plate 14.1 lays adjacent to upper surface 28.21 of electrode plate 14.2 such that conductive pads formed thereon are in contact with one another to provide pad-to-pad continuity therebetween. The coolant flow paths 46.1, 46.2 align with one another to define the coolant flow field in bipolar plate 14.

Electrode plate 16.1 has reactant gas flow channels 52.1, 54.1 formed on upper surface 38.11 which define anode and cathode reactant gas flow fields, respectively. Electrode plate 16.2 also has reactant gas flow channels 52.2, 54.2 formed on lower surface 38.22 which define cathode and anode reactant gas flow fields, respectively. Electrode plate 16.1 has coolant flow channels 56.1 formed on lower surface 38.12 which, in part define a coolant flow field. Electrode plate 16.2 has coolant flow channels 56.2 formed on upper surface 38.21 which in part define the coolant flow field.

As presently preferred, electrode plates 16.1, 16.2 are stacked together to form a bipolar plate 16. More specifically, lower surface 38.12 of one electrode plate 16.1 lays adjacent to upper surface 38.21 of electrode plate 16.2 such that conductive pads formed thereon are in contact with one another to provide pad-to-pad continuity therebetween. The coolant flow paths 56.1, 56.2 align with one another to define the coolant flow field in bipolar plate 16.

As described herein, the configuration of the reactant gas flow fields is dependent, in part, upon the number of zones within the fuel cell 10. As such, surfaces 28.11, 28.12 and 28.21, 28.22 can include a single anode flow field and multiple cathode flow fields, a single cathode flow field and multiple anode flow fields or multiple anode and cathode flow fields. It should also be noted that all of the flow paths are schematically illustrated in FIG. 1. Thus, while the reactant gas flow fields are schematically illustrated as serpentine flow fields and the coolant flow fields are schematically illustrated as a series of parallel paths, it will be appreciated that the flow field designs can vary in accordance with the specifications of a particular application.

The MEA 12 is sandwiched between bipolar plates 14, 16 and is separated therefrom by the diffusion media 18 and the gaskets 20. The bipolar plates 14, 16 are positioned such that the conductive pads 26, 36 are staggered. More specifically, the conductive pad 26.22 of the upper bipolar plate 14 are laterally offset from the conductive pad 36.11 of the lower bipolar plate 16. This staggered relationship of the conductive pads 26, 36 across the MEA 12 is repeated throughout the fuel cell stack 10 to provide multiple series current flow paths as described above.

For any given cell, the reactant gas flow paths 42.2, 44.2 on one side of the MEA 12 are aligned with the complementary reactant gas flow paths 54.1, 52.1 on the opposite side thereof such that the MEA 12 is interposed between an anode flow field and a cathode flow field. For example, as shown in FIG. 2, the lower surface 28.12 of bipolar plate 14 includes an anode flow path 42.2 and a pair of cathode flow paths 44.2 cathode flow path 36. The upper surface 38.21 of bipolar plate 16 includes a pair of anode flow paths 52.1 and a cathode flow path 54.1. Formed as such, three current zones I, II, III are defined across the MEA 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell providing incremental voltage summation within the fuel cell comprising:
 a membrane electrode assembly (MEA) with a first reactant face and a second reactant face;
 a first separator plate, including a non-conductive substrate, having a first face adjacent said first reactant face with a first electrode pad formed across a first region of said first face with a first reactant gas flow field formed therein, and a second electrode pad formed across a second region of said first face with a second reactant gas flow field formed therein, wherein said first electrode pad is spaced apart from and electrically isolated from said second electrode pad by said non-conductive substrate;
 a second separator plate, including a non-conductive substrate, having a second face adjacent said second reactant face with a third electrode pad formed across a third region of said second face with a third reactant gas flow field formed therein, and a fourth electrode pad formed across a fourth region of said second face with a fourth reactant gas flow field formed therein, wherein said third electrode pad is spaced apart from and electrically coupled to said fourth electrode pad; and
 a third face formed on said first separator plate with a fifth electrode pad formed across a fifth region of said third face opposite said first region with a fifth reactant gas flow field formed therein and a sixth electrode pad formed across a sixth region of said third face opposite said second region with a sixth reactant gas flow field formed therein,
 wherein said first electrode pad is electrically coupled to said fifth electrode pad by a conductor extending through said first separator plate, said second electrode pad is spaced apart from and electrically isolated from said sixth electrode pad, and said fifth electrode pad is spaced apart from and electrically isolated from said sixth electrode pad by said non-conductive substrate,
 wherein a multiple-legged current flow path is established in the fuel cell through each of said electrode pads defined directly in said first and said second separator plates, including a first leg from said fifth electrode pad through said conductor to said first electrode pad such that the current flow path is established through an outer perimeter of the first substrate, said first leg continuing through said MEA to said third electrode pad and a second leg from said fourth electrode pad through said MEA to said second electrode pad.

2. The fuel cell of claim 1 further comprising:
 a first diffusion medium interposed between said first reactant face and said first face at said first region;
 a second diffusion medium interposed between said first reactant face and said first face at said second region, said second diffusion medium being spaced apart and sealed from said first diffusion medium;
 a third diffusion medium interposed between said second reactant face and said second face at said third region; and
 a fourth diffusion medium interposed between said second reactant face and said second face at said first region, said fourth diffusion medium being spaced apart and sealed from said third diffusion medium.

3. The fuel cell of claim 2 further comprising:
 a seventh electrode pad formed across a seventh region of said first face with a seventh reactant gas flow field formed therein, wherein said seventh electrode pad is spaced apart from and electrically coupled to said second electrode pad; and
 an eighth electrode pad formed across an eighth region of said second face with an eighth reactant gas flow field formed therein, wherein said eighth electrode pad is spaced apart from and electrically isolated from said fourth electrode pad; and
 wherein said multiple-legged current flow path further includes a third leg from said seventh electrode pad through said MEA to said eighth electrode pad.

4. The fuel cell of claim 3 further comprising:
 a fifth diffusion medium interposed between said first reactant face and said first face at said seventh region, said fifth diffusion medium being spaced apart and sealed from said second diffusion medium; and
 a sixth diffusion medium interposed between said second reactant face and said second face at said eighth region, said sixth diffusion medium being spaced apart and sealed from said fourth diffusion medium.

5. The fuel cell of claim 1 further comprising:

a fourth face formed on said second separator plate with a seventh electrode pad formed across a seventh region of said fourth face opposite said third region with a seventh reactant gas flow field formed therein and an eighth electrode pad formed across an eighth region of said fourth face opposite said fourth region with an eighth reactant gas flow field formed therein;

wherein said third electrode pad is electrically isolated from said seventh electrode pad, said fourth electrode pad is electrically isolated from said eighth electrode pad, and said seventh electrode pad is electrically coupled to said eighth electrode pad.

6. The fuel cell of claim 1 wherein said first separator plate further comprises a first coolant flow field formed therethrough.

7. The fuel cell of claim 6 wherein said second separator plate further comprises a second coolant flow field formed therethrough.

8. The fuel cell of claim 6 wherein said first coolant flow field comprises:

a first coolant flow field region formed in said first separator plate adjacent said first region; and a second coolant flow field region formed in said first separator plate adjacent said second region.

9. The fuel cell of claim 8 said second separator plate further comprises:

a third coolant flow field region formed in said second separator plate adjacent said third region; and a fourth flow field region formed in said second separator plate adjacent said fourth region.

* * * * *